(12) United States Patent
Freissler et al.

(10) Patent No.: US 11,592,324 B2
(45) Date of Patent: Feb. 28, 2023

(54) DOSING PUMP WITH LINEAR MOTOR

(71) Applicant: ProMinent GmbH, Heidelberg (DE)

(72) Inventors: Bernd Freissler, Dielheim (DE);
Thomas Freudenberger, Ludwigshafen (DE); Marc Mohr, Mannheim (DE);
Martin Reinhard, Heidelberg (DE);
Martin Wittmer, Weinheim (DE)

(73) Assignee: ProMinent GmbH, Heidelberg (DE)

( * ) Notice: Subject to any disclaimer, the term of this patent is extended or adjusted under 35 U.S.C. 154(b) by 38 days.

(21) Appl. No.: 15/734,296

(22) PCT Filed: May 29, 2019

(86) PCT No.: PCT/EP2019/063952
§ 371 (c)(1),
(2) Date: Dec. 2, 2020

(87) PCT Pub. No.: WO2019/233850
PCT Pub. Date: Dec. 12, 2019

(65) Prior Publication Data
US 2021/0223081 A1    Jul. 22, 2021

(30) Foreign Application Priority Data
Jun. 6, 2018    (DE) ...................... 10 2018 113 421.5

(51) Int. Cl.
*G01F 11/02*    (2006.01)
(52) U.S. Cl.
CPC .................................. *G01F 11/029* (2013.01)
(58) Field of Classification Search
CPC ......... G01F 11/029; G01F 11/023; B01J 4/02; F04B 13/00; F04B 9/1215; F04B 9/1222
See application file for complete search history.

(56) References Cited

U.S. PATENT DOCUMENTS 2,694,415 A * 11/1954 Dillon ................... G05D 23/021
                                                        236/DIG. 5
2,869,585 A *  1/1959 Baker .................. F04B 43/0054
                                                        92/101
(Continued)

FOREIGN PATENT DOCUMENTS

CH         675216 A5 *   9/1990 ................ B01J 4/02
CN       101245770 A  *   8/2008
(Continued)

OTHER PUBLICATIONS

Nora Lindner, The International Bureau of the World Intellectual Property Organization, International Preliminary Report on Patentability, PCT/EP2019/063952, dated Dec. 8, 2020 (English translation).

*Primary Examiner* — Bob Zadeh
(74) *Attorney, Agent, or Firm* — Paul & Paul

(57) ABSTRACT

The invention concerns a dosing pump for moving a fluid, comprising a dosing head in which there is a dosing chamber and a displacement element reciprocatable between a first and a second position, wherein the displacement element delimits the dosing chamber, and the volume of the dosing chamber in the first position of the displacement element is greater than the volume of the dosing chamber in the second position of the displacement element, wherein the displacement element is coupled to a linear motor by way of a stroke element in such a way that in operation of the linear motor the stroke element performs a forward stroke and a return stroke in a housing in a direction of a movement axis with a stroke length h and the displacement element is reciprocated between the first position and the second position. To provide a dosing pump and to improve dosing pumps which are driven with a linear motor it is therefore proposed according to the invention that the stroke element has a cross-sectional area Q perpendicularly to the movement (Continued)

Figure 1:
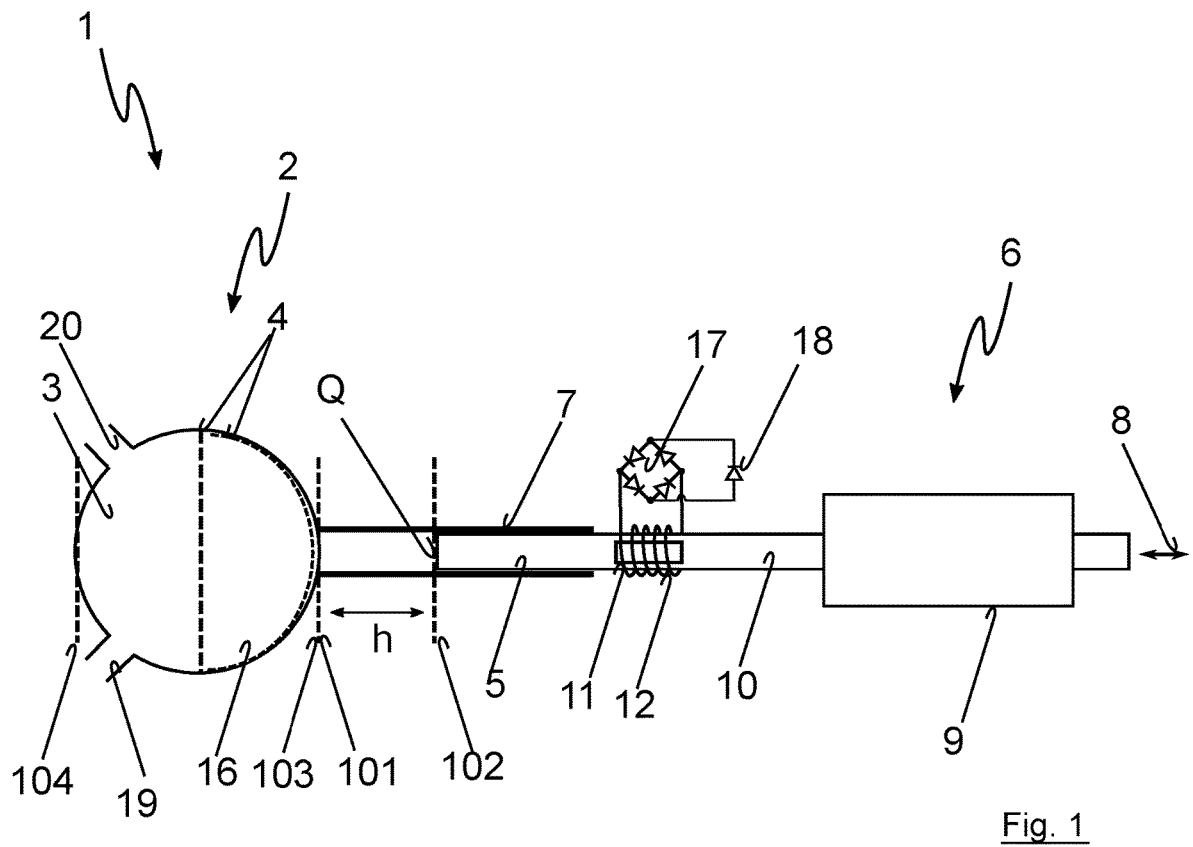

axis, wherein the square of the stroke length h is at least forty times greater than the cross-sectional area Q.

17 Claims, 2 Drawing Sheets

(56) References Cited

U.S. PATENT DOCUMENTS

| | | | |
|---|---|---|---|
| 4,624,625 A | | 11/1986 | Schrenker |
| 5,019,127 A | * | 5/1991 | Bohm ................ B65B 3/32 |
| | | | 222/1 |
| 5,047,950 A | | 9/1991 | Fritsch et al. |
| 5,261,883 A | * | 11/1993 | Hood ................ A61M 1/80 |
| | | | 606/107 |
| 5,330,721 A | * | 7/1994 | Tervamaki ........ B01L 3/0234 |
| | | | 422/515 |
| 5,983,777 A | * | 11/1999 | Cassaday ........ F04B 43/0063 |
| | | | 92/97 |
| 6,024,254 A | | 2/2000 | Oberschelp |
| 7,111,757 B1 | * | 9/2006 | O'Brien ............ G01F 11/029 |
| | | | 222/386 |
| 8,253,281 B2 | | 8/2012 | Namuduri et al. |
| 8,388,321 B2 | | 3/2013 | Wilmsen |
| 10,717,077 B2 | | 7/2020 | Reichmuth et al. |
| 2010/0072301 A1 | * | 3/2010 | Cater ................ B05B 9/0861 |
| | | | 239/333 |
| 2016/0051740 A1 | * | 2/2016 | Wegener ............ A61M 60/847 |
| | | | 417/199.1 |
| 2017/0341072 A1 | * | 11/2017 | Reichmuth ........ G01F 11/029 |
| 2021/0223081 A1 | * | 7/2021 | Freissler ............ G01F 11/029 |

FOREIGN PATENT DOCUMENTS

| | | | | |
|---|---|---|---|---|
| CN | 102317628 A | * | 1/2012 | ............ A01J 11/16 |
| DE | 3139925 A1 | | 10/1981 | |
| DE | 3546189 A1 | | 12/1985 | |
| DE | 202005013090 U1 | | 1/2007 | |
| DE | 102007062911 A1 | | 6/2009 | |
| DE | 102010008318 A1 | | 11/2010 | |
| DE | 102014017971 A1 | | 6/2016 | |
| DE | 112008000123 B4 | | 7/2016 | |
| DE | 102016119069 A1 | | 4/2018 | |
| EP | 110276 A | * | 6/1984 | ........ A61M 5/14216 |
| EP | 0484050 A1 | * | 5/1992 | ............ A61M 3/022 |
| EP | 0886127 A1 | | 12/1998 | |
| EP | 1911479 A1 | | 4/2008 | |
| EP | 3050585 A1 | * | 8/2016 | ......... A61B 5/14532 |

* cited by examiner

DOSING PUMP WITH LINEAR MOTOR

CROSS-REFERENCE TO RELATED APPLICATIONS

This application is a national stage of PCT/EP2019/063952, filed May 29, 2019, and claims the priority of German Application No. 10 2018 113 421.5, filed on Jun. 6, 2018.

The present invention concerns a dosing pump for moving a fluid, comprising a dosing head in which there is a dosing chamber and a displacement element reciprocatable between a first and a second position, wherein the displacement element delimits the dosing chamber, and the volume of the dosing chamber in the first position of the displacement element is greater than the volume of the dosing chamber in the second position of the displacement element, wherein the displacement element is coupled to a linear motor by way of a stroke element in such a way that in operation of the linear motor the stroke element performs a forward stroke and a return stroke in a housing in a direction of a movement axis with a stroke length h and the displacement element is reciprocated between the first position and the second position.

Dosing pumps are known from the state of the art. Most situations of use for dosing pumps require dosing of an adjustable delivery flow of the fluid to be transported from a suction container at lower pressure into a pressure container or a conduit at higher pressure.

Thus such dosing pumps are frequently used to dose chemicals. To ensure dosing with a dosing pump provided in the dosing head, more precisely in the dosing chamber, is a displacement element which is reciprocatable between a first and a second position and which delimits the dosing chamber. Movement of the displacement element is effected by a drive which can be for example a motor or part of a motor.

The dosing chamber of such a dosing pump also has a fluid outlet, through which delivery fluid accommodated in the dosing chamber can be transported out of the dosing head. In that case transportation of the fluid out of the dosing head is effected by a reduction in the volume of the dosing chamber.

If such a dosing pump is operated only with a fluid outlet then it can be used as a pulsator. Pulsators can for example drive extraction columns. In most cases however the dosing head will additionally have a fluid inlet, by way of which fluid to be conveyed can be sucked into the dosing head. In that case such a pump can also be used for conveying a delivery fluid so that, upon the increase in the volume of the dosing chamber, additional delivery fluid is sucked in by way of the fluid inlet and upon a reduction in the volume of the dosing chamber the fluid can be transported out of the dosing chamber by way of the fluid outlet. An unintentional backflow of the delivery fluid can additionally be prevented by suitably arranged check valves.

By way of example a piston can be used as the displacement element. As an alternative thereto the displacement element can also be a diaphragm. Besides the displacement element the dosing pump can additionally have a stroke element, wherein the stroke element then provides for the drive for the displacement element by a force coupling between the stroke element and the displacement element. In that respect if is possible that the displacement element and the stroke element are in one piece or that there is a connection between the displacement element and the stroke element. The only important consideration in that connection is that there is a force coupling between the displacement element and the stroke element so that the stroke element can drive the displacement element.

The stroke element can in turn be coupled to a motor, in the present case a linear motor. The linear motor substantially comprises a stationary element and a moveable element which moves linearly relative to the stationary element. The stroke element in that case is coupled to the linear motor in such a way that the stroke element is driven by the linear motor and the stroke element performs a forward stroke and a return stroke in the direction of a movement axis with a stroke length h. As a consequence of the movement of the stroke element and the force coupling between the stroke element and the displacement element the displacement element completes a reciprocating movement between the first position and the second position.

A force coupling between the displacement element and the stroke element however can also involve a hydraulic fluid. In that case for example a displacement element in the form of a diaphragm could delimit the dosing chamber from a hydraulic chamber in which a hydraulic fluid is arranged. The stroke element is then part of a hydraulic drive.

By virtue of the force coupling between the stroke element and the displacement element therefore the displacement element can be reciprocated between two positions and in each stroke substantially the delivery fluid volume is conveyed, corresponding to the change in the dosing chamber volume by virtue of the movement of the displacement element. A deviation between the delivery fluid volume and the change in the dosing chamber volume occurs in particular at high pressures (for example 400 bars) due to the compressibility of the fluid, which is not to be disregarded.

Exact dosing is generally difficult in the case of diaphragm pumps driven by way of hydraulic fluids as often fluid amounts are to be dosed, which do not exactly correspond to the delivery volumes which are provided per stroke movement. That occurs in particular at high pressures (for example 400 bars) if the compressibility of the hydraulic fluid is no longer to be disregarded and therefore reduces the efficiency. It is therefore advantageous if dead spaces in the hydraulically driven system are as small as possible as the hydraulic fluid volume which is not required reduces the level of efficiency.

Usually rotating electric motors are used as the drive, in which a rotating movement has to be converted into an oscillating movement.

Pumps have already been proposed which have a linear motor as the drive.

There are however also disadvantages when using a linear motor as a component part of a drive for the displacement elements of pumps. Thus for example the force transmitted by a linear motor to a stroke element is comparatively slight, in comparison with conventionally rotating electric motors. Accordingly the so-called rod force, that is to say the force that the stroke element transmits, for example to a hydraulic fluid, is low. The known pumps cannot be used in particular in high-pressure applications.

Therefore an object of the present invention is to provide a dosing pump which attenuates or overcomes at least one of the above-mentioned disadvantages. In particular an object of the present invention is to provide a dosing pump which can also be used in the high-pressure area.

That object is attained by a dosing pump of the kind set forth in the opening part of this specification, in which the stroke element has a cross-sectional area Q perpendicularly to the movement axis, wherein the square of the stroke length h is at least forty times greater than the cross-sectional area Q.

The term square of the stroke length is used to denote the product of the stroke length h by itself, that is to say h×h.

The underlying idea of the invention is to reduce the cross-sectional area and at the same time prolong the stroke length h.

Usually the endeavour is to achieve the opposite as, in the case of rotatingly driven electric motors, a smaller stroke length simplifies conversion of the rotary movement into a linear movement. In the case of linear motors however that does not play such a large part.

Dead spaces can be reduced by the reduction in the cross-sectional area. At the same time it is possible to increase the pressure which is exerted on the displacement element by the linear motor.

In a preferred embodiment of the present invention the cross-sectional area Q is polygonal or rectangular and preferably square and particularly preferably circular.

In an embodiment the stroke length h is at least eighty times, preferably at least a hundred times and best at least two hundred times greater than the cross-sectional area Q. That ratio has been found to be particularly advantageous at operating pressures of greater than or equal to 400 bars, wherein at those high pressures the compressibility of the delivery fluid is no longer negligible so that in particular dead spaces have an adverse effect on the dosing characteristic.

In a preferred embodiment of the present invention the moveable element in operation of the linear motor moves relative to the stationary element between a first end position and a second end position, wherein the stroke element is either connected to the moveable element of the linear motor or is integral therewith. By virtue of the connection or the integral configuration the stroke element directly follows the movement of the moveable element of the linear motor.

In an embodiment of the present invention the moveable element of the linear motor and/or the stroke element and/or the displacement element have a permanent magnet which moves with the moveable element and/or with the stroke element and/or with the displacement element, wherein the dosing pump has an induction device and wherein the permanent magnet and the induction device are of such a configuration and are so arranged relative to each other that an electrical voltage is induced in the induction device by a movement of the permanent magnet.

Such an arrangement has proven to be particularly advantageous for the situation where, for safety reasons, current-carrying and voltage-carrying feed lines are not to be passed from the exterior into certain regions within the dosing pump or that is possible only at the cost of major shielding. That can be prescribed for example for reasons of explosion protection.

By virtue of the arrangements according to the invention therefore current can be generated within the pump in order for example to operate an LED as an operational display or to actuate a fan. Feed lines from the exterior are not necessary.

In principle it is sufficient if either the stroke element or the moveable element of the linear motor or the displacement element has a permanent magnet.

It is however also possible that both the moveable element of the linear motor and also the stroke element have a permanent magnet. By the use of a permanent magnet on the moveable element of the linear motor and the stroke element the length of the linear motor is ideally utilised. In that embodiment with a permanent magnet on the moveable element of the linear motor and the stroke element it would even be possible for a plurality of induction devices to be so arranged relative to the permanent magnet and to be of such a configuration that the movement of the permanent magnets leads to an induced voltage in both induction devices.

In an embodiment of the present invention the induction device has a coil with a cross-sectional area A, a length L and a number of turns N. In general an ac voltage is induced within the induction device by the movement of the permanent magnet. To convert that ac voltage into a dc voltage there is provided for example a rectifier circuit. By means of the rectifier circuit elements of the dosing pump can then be supplied with dc voltage and direct current, like for example an LED and/or a fan.

In a further preferred embodiment of the invention the dosing pump has an energy storage means, wherein the energy storage means is so connected to the moveable element of the linear motor that energy is transferred to the energy storage means by movement of the moveable element in the direction of the first end position and the energy storage means then delivers the stored energy to the moveable element when the moveable element is moved in the direction of the second end position.

The costs of linear motors increase greatly with the power output. In the case of the described dosing pump the linear motor in its movement from the first end position to the second end position has to generate a force which is sufficient so that the displacement element coupled thereto builds up in the dosing chamber a pressure which is greater than the pressure at the outlet connection of the dosing pump. That can be several 100 bars in particular in high-pressure applications. In contrast a much lower force is necessary for the movement from the second end position to the first end position. Usually motors are designed on the basis of the maximum force required. The measure according to the invention is based on the consideration that the force requirement in the dosing pump is pronouncedly asymmetric so that, in the movement of the moveable element in the direction of the first end position the linear motor is capable of transmitting even markedly more force. Therefore there is provided an energy storage means which, whenever the moveable element is moved in the direction of the first end position is charged up and whenever the moveable element is moved in the direction of the second end position transmits the energy to the moveable element. In that case for example the movement of the moveable element provides that a kinetic energy generated by the linear motor can be converted into another form of energy which can be stored by the energy storage means.

In the movement of the moveable element of the linear motor from the second end position into the first end position for example energy transmission can be effected continuously to the energy storage means. The energy storage means delivers that stored energy to the moveable element again when it is moved from the first end position into the second end position. The delivery of the energy from the energy storage means to the moveable element can then be effected continuously.

It may however also be advantageous if the entire energy stored in the energy storage means is delivered at a given moment in time substantially abruptly to the moveable element and by way of the moveable element to the stroke element. That can be advantageous for example when the force requirement in the compression stroke, that is to say when the moveable element is moved from the first end position in direction of the second end position, is not uniform, but for example is at its greatest at the beginning of the pressure stroke. It is then advantageous if the energy storage means delivers its stored energy at the beginning of the pressure stroke to the moveable element of the linear motor.

In a preferred embodiment of the present invention the energy storage means is connected to the moveable element of the linear motor and is associated therewith in such a way that an energy stored in the energy storage means can be transmitted to the moveable element at any moment in time as long as the moveable element is in a movement from the first end position in the direction of the second end position.

In a further preferred embodiment of the present invention the energy storage means is so designed and adapted that an energy transmitted to the energy storage means by the movement of the moveable element can be accumulated by the energy storage means and at any moment in time and as long as the moveable element is in a movement from the first end position in the direction of the second end position can be transmitted to the linear element again. By way of example the dosing pump could be adjustable by way of a control device in such a way that an energy accumulated in the energy storage means is delivered from the energy storage means to the moveable element only in each third movement of the moveable element from the first end position in the direction of the second end position. Consequently an increased transmission of force from the moveable element to the stroke element would also occur only in each third movement of the moveable element from the first end position in the direction of the second end position so that each third stroke movement of the stroke element takes place with an increased rod force.

In an embodiment of the present invention the energy storage means stores the energy in the form of a pneumatic, hydraulic, electrical or mechanical energy.

By way of example in an embodiment of the present invention the linear motor is so designed and arranged that the moveable element of the linear motor is moved in the direction and in the opposite direction of its force due to its weight, that is predetermined by the gravitational field. In that case the moveable element moves in the direction of its weight force predetermined by the gravitational field when it moves starting from the first end position in the direction of the second end position. Correspondingly the moveable element is moved in the opposite direction of its weight force which is predetermined by the gravitational field when it moves starting from the second end position in the direction of the first end position. Basically the moveable element itself is the energy storage means, which is so arranged that in the first end position it has a higher potential energy than in the second end position. In that way the energy storage means can store a mechanical energy in the form of a potential energy which occurs as a consequence of the movement of the moveable element in the opposite direction to the weight force predetermined by the gravitational field and thus in the direction of the second end position. As soon as the moveable element is in the second end position the energy stored in the energy storage means can be delivered to the moveable element again so that, in the movement of the moveable element starting from the first end position in the direction of the second end position, the potential energy stored by the energy storage means is converted into kinetic energy again and is thus delivered to the moveable element of the linear motor. Thus in the movement in the direction of the second end position the moveable element will have an additional energy which increases the transmission of force of the moveable element to the stroke element so that the force of the stroke element is increased during the pressure stroke.

To increase the storable potential energy a conceivable embodiment of the invention is one in which the dosing pump additionally has a weight force-generating element which is so arranged and adapted relative to the moveable element of the linear motor that it is received by the moveable element in the movement of the moveable element starting from the second end position in the direction of the first end position so that the stored potential energy is then increased. In other words, between the first end position and the second end position of the moveable element of the linear motor there exists an intermediate position at which the moveable element receives or releases the weight force-generating element. Accordingly the movement of the moveable element between the second end position and the intermediate position occurs without the moveable element being connected to the weight force-generating element. It is only when the moveable element reaches the intermediate position on its way from the second end position into the first end position that the weight force-generating element is received and increases the potential energy thereof. The potential energy of the weight force-generating element is then available in the return movement of the moveable element from the detected end position to the intermediate position. In this embodiment it is not necessary for the moveable element in the first end position to involve a greater potential energy than in the second end position. The moveable element could be connected to the weight force-generating element with a cable guided over a direction-changing roller.

In a further preferred embodiment of the present invention the moveable element is connected to the stroke element but is not integral therewith. In addition the moveable element of the linear motor and the stroke element have a releasable connection, wherein the releasable connection is of such a configuration and arrangement that the moveable element in the movement from the second end position in the direction of the first end position is released from the stroke element when the stroke element has concluded the return movement and thus the displacement element is in the first position, and wherein the moveable element in the movement starting from the first end position in the direction of the second end position is connected to the stroke element when the moveable element meets the stroke element. The spacing between the first end position and the second end position of the moveable element is thus greater than the spacing between the first position and the second position of the stroke element. Therefore the movement of the moveable element is greater than the stroke of the displacement element and energy storage preferably occurs when the displacement element is in the first position and the moveable element moves in the direction of its first end position.

Accordingly the moveable element of the linear motor can continue the movement into the first end position although the stroke element has already concluded the return stroke, therefore the stroke element has already reached the position at the end of the return stroke. In conjunction with an energy storage means therefore energy can be transmitted to the energy storage means by the movement of the moveable element in the direction of the first end position even beyond the return stroke of the stroke element.

In a further preferred embodiment of the present invention the dosing pump has a fixing device which is of such a configuration and arrangement that upon release of the moveable element from the stroke element the stroke element is fixed in the position at the end of the return stroke with the fixing device and the stroke element is released from the fixing device again only when the moveable element again meets the stroke element.

Such a fixing device in combination with a releasable connection has proven to be particularly advantageous as the fixing device provides that the stroke element does not perform a possible forward stroke of its own accord at the end of the return stroke. Such a forward stroke performed of its own accord would not be desirable and would have an adverse effect on the result of the pump property. By virtue of the force coupling between the displacement element and the stroke element the displacement element also performs a movement when the stroke element performs a movement.

It is to be understood in that respect that the displacement element is in the second position when the stroke element has concluded its forward stroke and the displacement element is in the first position when the stroke element has concluded its return stroke. Accordingly the fixing device also has an advantageous effect on the displacement element as temporary fixing of the stroke element at the same time provides for temporary fixing of the displacement element in the first position.

In a preferred embodiment of the present invention the cross-sectional area Q is less than or equal to $0.8$ cm$^2$, preferably less than or equal to $0.2$ cm$^2$ and particularly preferably less than or equal to $0.75$ cm$^2$.

In a particularly preferred embodiment of the present invention the cross-sectional area Q of the stroke element is circular of a diameter of 6 mm or less, wherein the stroke length h of the stroke element is at least 60 mm.

In a further particularly preferred embodiment of the invention the cross-sectional area Q is circular of a diameter of 3 mm or less, wherein the stroke length h of the stroke element is 60 mm or more.

In an embodiment of the present invention the displacement element is a diaphragm. The diaphragm involved can be for example short-stroke diaphragms which are frequently made from metal and so-called long-stroke diaphragms which are typically made from plastics like for example PTFE or rubber.

In an embodiment of the present invention the dosing head is subdivided by the displacement element into the dosing chamber and a hydraulic chamber with a hydraulic fluid, wherein the stroke element is so arranged in the hydraulic chamber of the dosing head that the stroke element performs a forward stroke and a return stroke in a housing of the hydraulic chamber in the direction of a movement axis with a stroke length h whereby a force which the stroke element exerts on the hydraulic fluid is transmitted to the displacement element.

In that embodiment the stroke element is part of a hydraulic drive, wherein the stroke element itself is connected to the moveable element of the linear motor or is integral therewith in such a way that the stroke element and the displacement element are coupled together by way of the hydraulic fluid. Thus the force which the stroke element exerts on the hydraulic fluid in operation of the linear motor as a consequence of a forward stroke is transmitted to the displacement element in such a way that the displacement element is moved into the second position. When the stroke element performs a return stroke movement then the displacement element, by way of the hydraulic fluid, experiences force transmission by which the displacement element is moved in the direction of the first position. It is possible to provide a spring biasing the displacement element into the first position to support the return stroke movement.

In an embodiment of the present invention in which the drive is a hydraulic drive the energy storage means, the moveable element of the linear motor, the stroke element and the displacement element are so adapted and so arranged relative to each other that the total energy stored by the energy storage means is transmitted from the moveable element to the stroke element and thus by way of the force coupling to the displacement element precisely when the moveable element meets the stroke element as a consequence of the movement from the first end position in the direction of the second end position so that instantaneous maximum pulse transmission occurs at the moment when the moveable element meets the stroke element.

Such instantaneous pulse transmission has proven to be particularly advantageous in conjunction with a hydraulic drive as it is precisely in the forward stroke of the stroke element that it is important that maximum pulse transmission occurs at a starting time of the forward movement to the hydraulic fluid and is thus transmitted to the displacement element.

Further advantages, features and possible uses of the present invention will be apparent from the description hereinafter of embodiments and the accompanying Figures.

Figure 2:
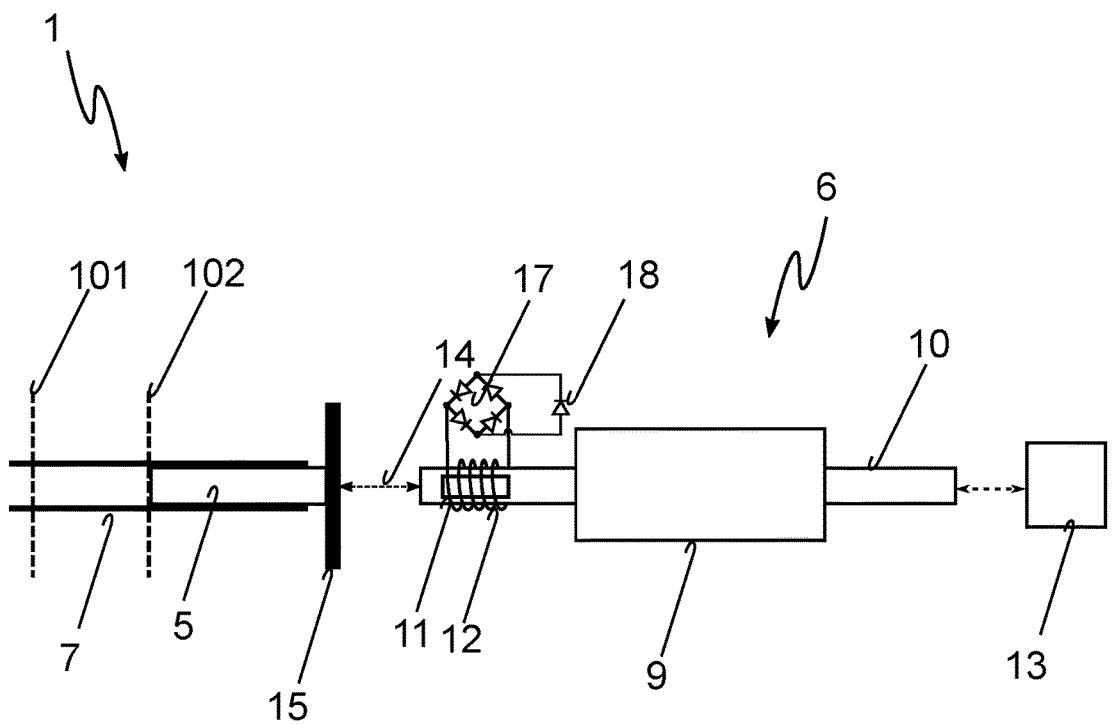
Figure 3:
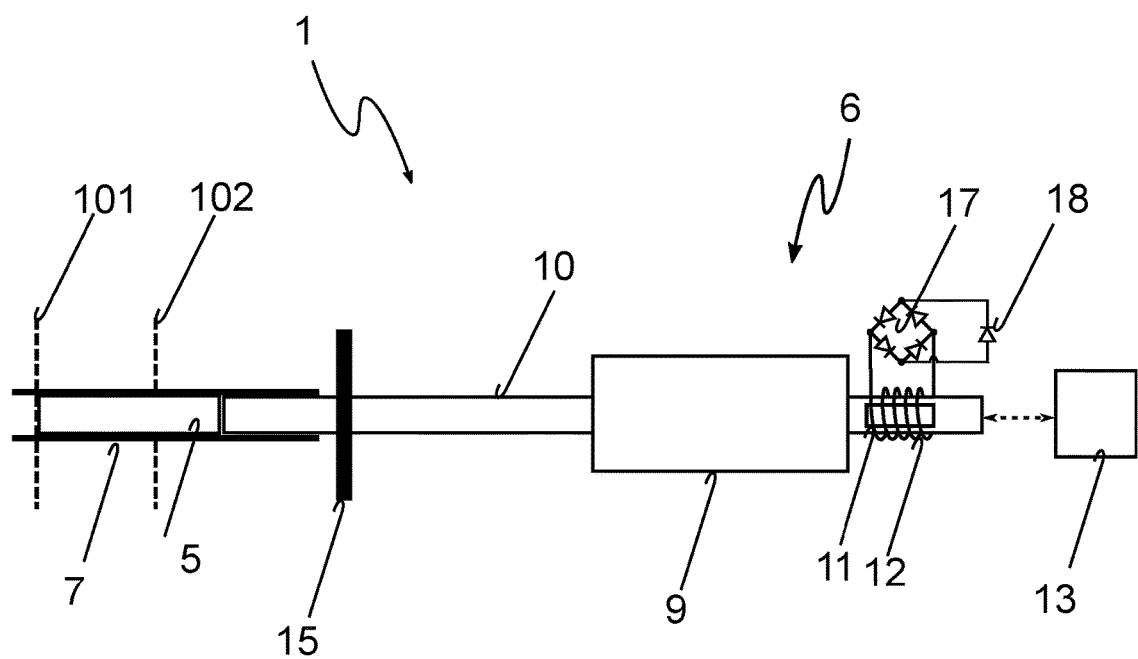
Figure 4:
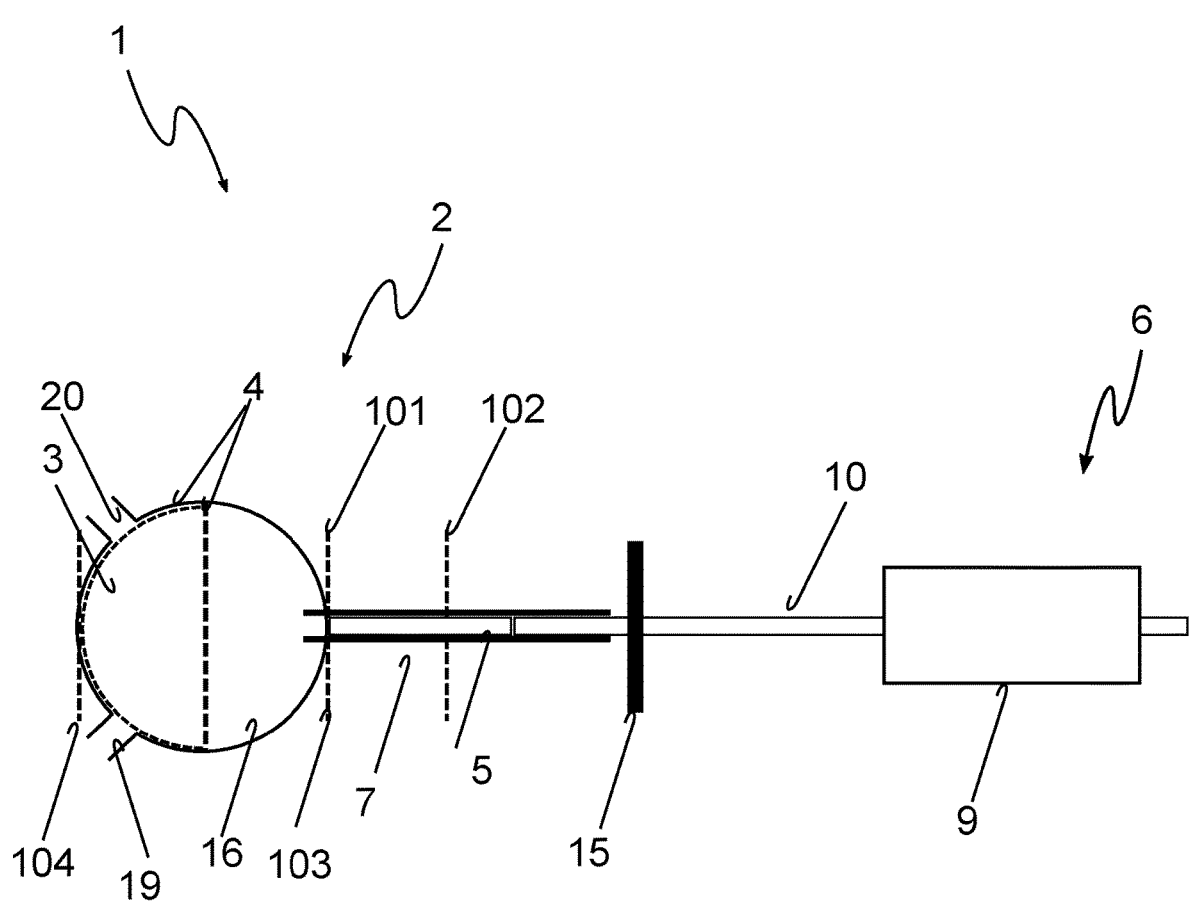

FIG. 1 shows a diagrammatic view according to a first embodiment of the present invention, FIG. 2 shows a diagrammatic view according to a second embodiment of the present invention, FIG. 3 shows a diagrammatic view according to a third embodiment of the present invention, and FIG. 4 shows a diagrammatic view according to a fourth embodiment of the present invention.

FIG. 1 is a diagrammatic view of a dosing pump 1 according to a first embodiment of the present invention. It shows a dosing pump 1 for moving a fluid, comprising a dosing head 2 in which a dosing chamber 3 is arranged and a displacement element 4 reciprocatable between a first position 103 and a second position 104. That displacement element is a diaphragm which delimits the dosing chamber 3, wherein the volume of the dosing chamber 3 in the first position 103 of the diaphragm element 4 is greater than the volume of the dosing chamber 3 in the second position 104 of the displacement element 4.

FIG. 1 shows the displacement element 4 as a dotted line arranged both in the first position and also in a central position in the dosing head 2. The dosing head 2 of the dosing pump 1 is subdivided by the displacement element 4 into the dosing chamber 3 and a hydraulic chamber 16 in which there is a hydraulic fluid.

Adjoining the hydraulic chamber 16 of the dosing head 2 there is a housing 7 in which a stroke element 5 is arranged. In this arrangement the displacement element 4 is coupled to a linear motor 6 by way of a stroke element 5, the linear motor 6 comprising a stationary element 9 and a moveable element 10. The stroke element 5 and the moveable element 10 of the linear motor 6 are of an integral structure. The displacement element 4 is coupled to the linear motor 6 by way of the stroke element 5 in such a way that in operation of the linear motor 6 the stroke element 5 performs a forward stroke in the direction of the second end position 101 in the housing 7 and a return stroke in the direction of the first end position 102 in the direction of a movement axis 8 with a stroke length h and the displacement element 4 reciprocates between the first position 103 and the second position 104.

In that situation the stroke element 5 exerts a force on the hydraulic fluid in the hydraulic chamber 16, which is transmitted to the displacement element 4. In the view in FIG. 1 the stroke element 5 is just in the position 102 at the end of the return stroke so that a force is transmitted to the displacement element 4 by way of the hydraulic fluid, which had the result that the displacement element 4 is at the end of the return stroke of the stroke element 5 in the first position 103. Basically the return force is produced by the fluid pressure of the delivery medium in the dosing chamber, that acts on the diaphragm, and by virtue of the low hydraulic fluid pressure provides for a movement of the displacement element into the first position.

The stroke element 5 has a cross-sectional area Q perpendicularly to the movement axis 8, the square of the stroke length h being a hundred times greater than the cross-sectional area Q. The cross-sectional area Q of the stroke element in this case is circular of a diameter of 6 mm and the stroke length h of the stroke element is 60 mm.

For pumping a fluid the dosing chamber 3 further has a fluid inlet 19 and a fluid outlet 20, wherein the fluid to be conveyed, by virtue of the alternating movement of the displacement element 4 between the first position 103 and the second position 104, is sucked in by way of the fluid inlet and discharged again by way of the fluid outlet. The operating pressure, that is to say the pressure with which the delivery fluid is pressed into the fluid outlet 20, with which the dosing pump operates, is for example 100 bars.

The integral stroke element and the moveable element have a permanent magnet 11 which in operation of the linear motor 6 moves with the integral stroke element and the moveable element 10. The dosing pump 1 also has an induction device 12 which substantially comprises a cylindrical coil with a cross-sectional area A, a length L and a number of turns N. The induction device 12 is connected to a rectifier circuit 17. In operation of the linear motor when the integral stroke element 5 and the moveable element 10 move relative to the stationary element 9 of the linear motor 6 along the movement axis 8 and thus the permanent magnet 11 also moves relative to the induction device 12 an ac voltage is induced in the induction device, the rectifier circuit 17 converting that ac voltage into a dc voltage so that an LED 18 can be operated by way of the induction device 12.

FIG. 2 shows a second embodiment of a dosing pump according to the present invention. For reasons of space the dosing head 2 which as shown in FIG. 1 would adjoin the housing 7 at the left is not shown in FIGS. 2 and 3.

Unlike FIG. 1 FIG. 2 has a stroke element 5 which is not of an integral configuration with the moveable element 10 of the linear motor 6. In that case there is a releasable connection 14 between the stroke element 5 and the moveable element 10 of the linear motor 6. The releasable connection 14 in that case is of such a configuration and arrangement that, in the movement from the second position in the direction of the first position, the moveable element 10 is released from the stroke element 5 when the stroke element 5 has concluded the return stroke movement and thus the displacement element 4 is in the first position 103. In addition the moveable element 10, by virtue of the releasable connection 14, is connected to the stroke element 5 again when the moveable element 10, starting from the first end position in the direction of the second end position, meets the stroke element 5 again.

As shown in FIG. 2 the stroke element 5 is just in the position of the return stroke 102 so that the displacement element 4 (not shown) is also in the first position 103. So that the stroke element 5 does not perform an autonomous forward stroke movement the dosing pump 1 has a fixing device 13 which is of such a configuration and arrangement that, upon release of the moveable element 10 from the stroke element 5, the stroke element 5 is temporarily fixed in the position at the end of the return stroke 102 with the fixing device 15 and the stroke element 5 is released from the fixing device 15 again only when the moveable element 10 again meets the stroke element 5.

FIG. 2 also shows an energy storage means 13 which is so connected to the moveable element 10 of the linear motor 6 that, by virtue of the movement of the moveable element 10 from the second end position in the direction of the first end position, energy is transmitted to the energy storage means 13 by the movement of the moveable element 10. The moveable element 10 of the linear motor 6 is precisely disposed in FIG. 2 in a movement in the direction of the first end position. In that situation the moveable element 10 is released from the stroke element 5 from the point at which the stroke element 5 has concluded its return stroke movement 102 so that, by virtue of the movement of the moveable element 10 in the direction of the second end position, energy is still transmitted to the energy storage means 13 even over the return stroke movement of the stroke element 5.

The moveable element 10 of the linear motor 6 is here a rod having a circular cross-section Q, the rod having two ends. A first end points in the direction of the first end position and a second end in the direction of the second end position. In the FIG. 2 embodiment the permanent magnet 11 is arranged in a region of the moveable element 10, that is at the second end of the moveable element 10. The induction device 12 in this case is so arranged that a voltage is induced in the induction device 12 upon a movement of the permanent magnet 11.

The embodiment of the present invention shown in FIG. 3 differs from the embodiment shown in FIG. 2 in that the permanent magnet 11 is arranged in a region of the moveable element 10, that is at the first end of the moveable element 10.

In addition FIG. 3 shows that the stroke element 5 is in the forward stroke movement at the end of the forward stroke 101. In this case the stroke element 5 was temporarily fixed by the fixing device 15 until the moveable element 10, as a consequence of the movement from the first end position in the direction of the second end position, has again met the stroke element 5. The stroke element 5 has then been released by the fixing device 15 and connected to the moveable element 10 of the linear motor 6 again by the releasable connection 14.

In the movement of the moveable element 10 starting from the first position in the direction of the second end position the energy storage means 13 has instantaneously delivered the stored energy to the moveable element 10 at the moment when the moveable element 10 has again met the stroke element 5. On the one hand the transmission of energy to the stroke element 5 increased its rod force. On the other hand the instantaneous transmission of energy provided that a maximum pulse transmission is effected at a starting time of the forward stroke movement of the stroke element 5, to the hydraulic fluid.

FIG. 4 shows a fourth embodiment of the present invention. This differs from the embodiments shown in FIGS. 1, 2 and 3 in that the stroke element 5 has a cross-sectional area Q perpendicular to the movement axis 8, the square of the stroke length h being 200 times greater than the cross-sectional area Q. The circular cross-sectional area Q of the stroke element 5 in this case is of a diameter of 3 mm, with a stroke length h of 60 mm. The operating pressure with which the dosing pump operates is 400 bars.

In addition for clarification in relation to FIG. 1 the position of the displacement element 4 in the dosing chamber 2 as a consequence of a stroke movement of the stroke element 5 is shown once again, with the stroke element 5 being at the end of the forward stroke in the position 101. Due to the force coupling between the stroke element 5 and the displacement element 4 the displacement element 4 is then in the second position and is deflected to the maximum. Fluid which was in the dosing chamber 3 has then been discharged from the dosing chamber 3 by way of the fluid outlet 20.

LIST OF REFERENCES 1 dosing pump
2 dosing head
3 dosing chamber
4 displacement element
5 stroke element
6 linear motor
7 housing
8 movement axis
9 stationary element
10 moveable element
11 permanent magnet
12 induction device
13 energy storage means
14 releasable connection
15 fixing device
16 hydraulic chamber
17 rectifier circuit
18 LED
19 fluid inlet
20 fluid outlet
101 position at the end of the forward stroke
102 position at the end of the return stroke
103 first position
104 second position
Q cross-sectional area Q
h stroke length h

The invention claimed is:

1. A dosing pump for moving a fluid, comprising a dosing head in which there is a dosing chamber having a volume and a displacement element reciprocatable between a first and a second position, wherein the displacement element delimits the dosing chamber, and the volume of the dosing chamber in the first position of the displacement element is greater than the volume of the dosing chamber in the second position of the displacement element, wherein the displacement element is coupled to a linear motor by way of a stroke element in such a way that in operation of the linear motor the stroke element performs a forward stroke and a return stroke in a housing in a direction of a movement axis with a stroke length h and the displacement element is reciprocated between the first position and the second position, characterised in that
the stroke element has a cross-sectional area Q perpendicularly to the movement axis, wherein the stroke length h squared is at least forty times greater than the cross-sectional area Q ($h^2 \geq 40Q$).

2. A dosing pump according to claim 1 characterised in that the stroke length h is at least eighty times greater than the cross-sectional area Q.

3. A dosing pump according to claim 2 characterised in that the linear motor comprises a stationary element and a moveable element, wherein in operation of the linear motor the moveable element performs a movement relative to the stationary element between a first end position and a second end position and wherein the stroke element is connected to the moveable element of the linear motor or is integral therewith.

4. A dosing pump according to claim 1 characterised in that the linear motor comprises a stationary element and a moveable element, wherein in operation of the linear motor the moveable element performs a movement relative to the stationary element between a first end position and a second end position and wherein the stroke element is connected to the moveable element of the linear motor or is integral therewith.

5. A dosing pump according to claim 4 characterised in that the moveable element of the linear motor and/or the stroke element and/or the displacement element have a permanent magnet which moves with the moveable element and/or with the stroke element and/or with the displacement element, wherein the dosing pump has an induction device and wherein the permanent magnet and the induction device are of such a configuration and are so arranged relative to each other that an electrical voltage is induced in the induction device by a movement of the permanent magnet.

6. A dosing pump according to claim 5 characterised in that the induction device is a cylindrical coil with a cross-sectional area A, a length l and a number of turns n.

7. A dosing pump according to claim 5 characterised in that the dosing pump has an energy storage means, wherein the energy storage means is so connected to the moveable element of the linear motor that energy is transferred to the energy storage means by a movement of the moveable element in the direction of the first end position and the energy storage means then delivers the stored energy to the moveable element when the moveable element is moved in the direction of the second end position.

8. A dosing pump according to claim 4 characterised in that the dosing pump has an energy storage means, wherein the energy storage means is so connected to the moveable element of the linear motor that energy is transferred to the energy storage means by a movement of the moveable element in a direction of the first end position and the energy storage means then delivers the stored energy to the moveable element when the moveable element is moved in a direction of the second end position.

9. A dosing pump according to claim 8 characterised in that the energy storage means stores pneumatic, hydraulic, electrical or mechanical energy.

10. A dosing pump according to claim 8 insofar as the moveable element is connected to the stroke element and is not integral therewith, characterised in that the moveable element of the linear motor and the stroke element have a releasable connection, wherein the releasable connection is of such a configuration and arrangement that the moveable element in the movement from the second end position in the direction of the first end position is released from the stroke element when the stroke element has concluded the return stroke movement and thus the displacement element is in the first position, and wherein the moveable element in the movement from the first end position in the direction of the second end position is connected to the stroke element when the moveable element meets the stroke element.

11. A dosing pump according to claim 10 characterised in that the dosing pump has a fixing device, wherein the fixing device is of such a configuration and arrangement that upon release of the moveable element from the stroke element the stroke element is temporarily fixed in a position at the end of the return stroke with the fixing device and the stroke element is released from the fixing device again only when the moveable element again meets the stroke element.

12. A dosing pump according to claim 10 characterised in that
the dosing head is subdivided by the displacement element into the dosing chamber and a hydraulic chamber with a hydraulic fluid, wherein the stroke element is so arranged in the hydraulic chamber of the dosing head that the stroke element performs the forward stroke and a return stroke in a housing of the hydraulic chamber in the direction of the movement axis with the stroke length h whereby a force which the stroke element exerts on the hydraulic fluid is transmitted to the displacement element, and in that
the energy storage means, the moveable element of the linear motor, the stroke element and the displacement element are so adapted and so arranged relative to each other that a total energy stored by the energy storage means is transmitted from the moveable element to the stroke element and thus by way of the force coupling to the displacement element precisely when the moveable element meets the stroke element as a consequence of the movement from the first end position in the direction of the second end position so that instantaneous maximum pulse transmission occurs at a moment when the moveable element meets the stroke element.

13. A dosing pump according to claim 1 characterised in that the displacement element is a diaphragm.

14. A dosing pump according to claim 1 characterised in that the cross-sectional area Q is less than or equal to 0.8 $cm^2$.

15. A dosing pump according to claim 14 characterised in that the cross-sectional area Q is less than or equal to 0.2 $cm^2$.

16. A dosing pump according to claim 15 characterised in that the cross-sectional area Q is less than or equal to 0.075 $cm^2$.

17. A dosing pump according to claim 1 characterised in that the dosing head is subdivided by the displacement element into the dosing chamber and a hydraulic chamber with a hydraulic fluid, wherein the stroke element is so arranged in the hydraulic chamber of the dosing head that the stroke element performs the forward stroke and a return stroke in a housing of the hydraulic chamber in the direction of the movement axis with the stroke length h whereby a force which the stroke element exerts on the hydraulic fluid is transmitted to the displacement element.

* * * * *